Patented Aug. 7, 1934

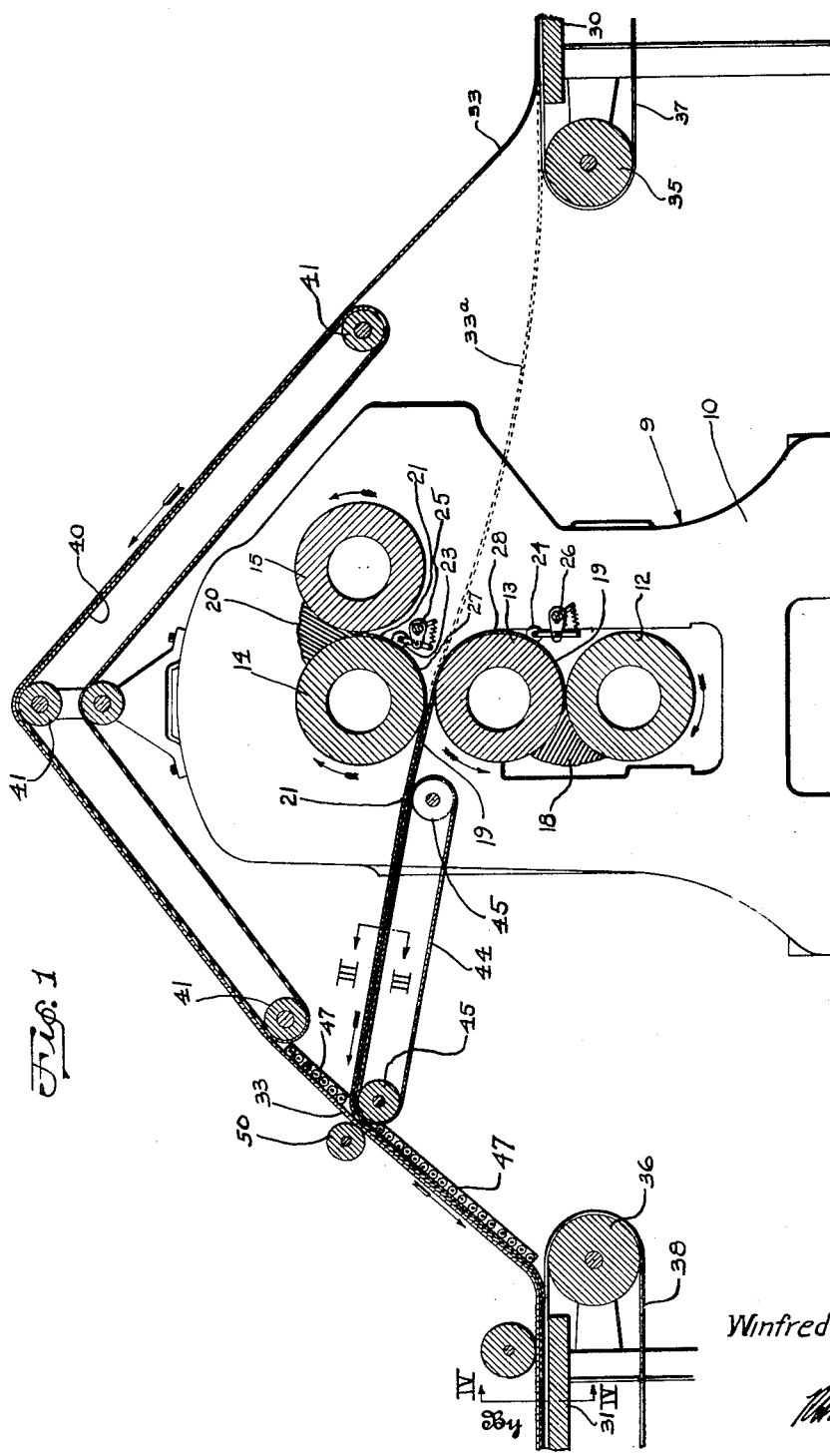

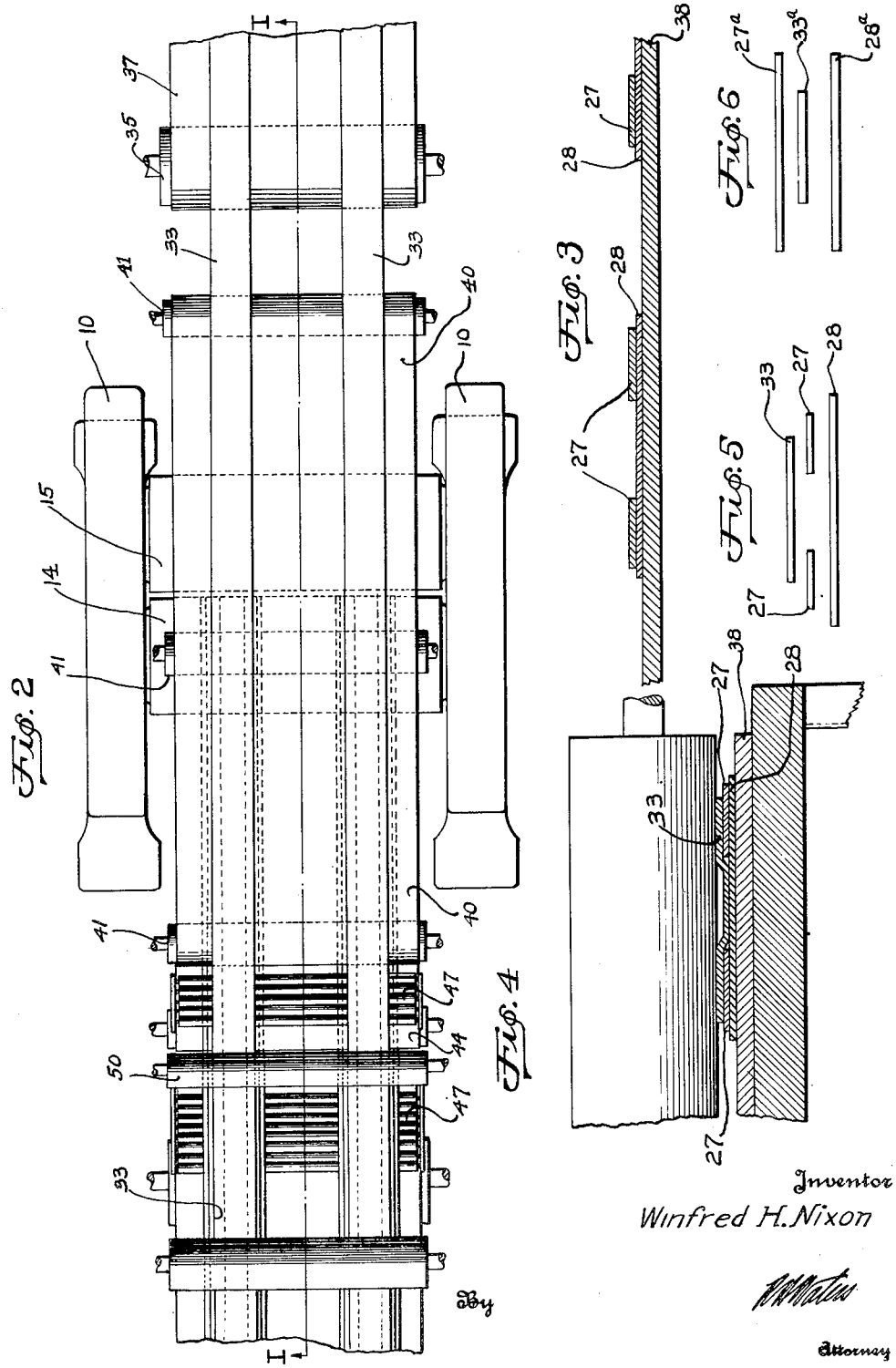

1,969,232

UNITED STATES PATENT OFFICE 1,969,232

APPARATUS FOR TREATING WEB MATERIAL

Winfred H. Nixon, Akron, Ohio, assignor to Wingfoot Corporation, Wilmington, Del., a corporation of Delaware Application May 21, 1932, Serial No. 612,743

1 Claim. (Cl. 154—1)

This invention relates to a method and apparatus for applying plastic sheets or strips to web material, and more particularly to a method and apparatus for cushioning breaker strips employed in building pneumatic tires.

Heretofore in coating web material with a thin sheet of rubber or other plastic material, upon one side or surface thereof, it has been customary to pass the web material through a calender upon which the rubber or plastic sheet is formed, which sheet is applied to the web material in its passage through the calender. The web material, after it is coated, is wound up upon a suitable roll with a liner sheet between the convolutions so that the convolutions will not stick together. The roll of web material, which is now coated on one side, will be brought back to the front of the calender and again passed through the calender, at which time a second sheet or coating of rubber or plastic is applied upon the surface of the web which has not been formerly coated. It will thus be evident that considerable time and labor were necessary in coating a sheet of web material upon both sides.

Again, in forming a plurality of strips from plastic rubber upon a suitable calender, some difficulty has been experienced in properly superimposing such strips in the desired relation and thereafter applying the superimposed strips upon or to the sides of any desired web member. If a number of trips are to be superimposed upon a web member, it has been the standard practice to pass the web member through the calender a plurality of times. By such a process one layer or set of strips is applied to the web member each time it passes through the calender, so that the web member must be passed through the calender as many times as there are superimposed strips. Inasmuch as each time the web member is passed through the calender requires a considerable amount of time and labor, it is evident that any method which eliminates the necessity of passing the web material through the calender a plurality of times will result in a considerable saving.

It is an object of the present invention to avoid and overcome the foregoing disadvantages of prior known methods and apparatuses by the provision of a relatively simple and efficient apparatus which is employed in such a manner that the web material can be either coated on both sides with plastic sheet, or can be provided with a plurality of layers of superimposed strips of plastic rubber, or the like, in a single passage through a calender.

Another object of the invention is to provide an apparatus wherein a plurality of strips can be formed and united in superimposed relation and thereafter applied to a continuously moving sheet of web material.

Another object of the invention is to provide a rapid, inexpensive and accurate method of producing and applying strips of rubber, or the like, in superimposed relation upon a sheet of web material.

Another object of the invention is to provide an apparatus for continuously applying rubber sheeting to both sides of a continuously moving sheet of web material.

Another object of the invention is to provide an apparatus for simultaneously applying cushion and gum strips to the sides of breaker fabric of the type employed in the construction of pneumatic tires.

Another object of the invention is to provide an improved, efficient and inexpensive process for continuously applying strips of rubber cushioning stock to the sides of a rubberized breaker strip.

Another object of the invention is to provide a simple, rapid and practical manner for applying sheets of rubber, or the like, upon opposite sides of a moving web.

For a better understanding of the invention reference may now be had to the accompanying drawings wherein:

Fig. 1 is a longitudinal cross-sectional view of the apparatus forming a part of the present invention. This view is taken on line I—I of Fig. 2;

Fig. 2 is a plan view of the apparatus comprising a part of the present invention;

Fig. 3 is a cross-sectional view, on a larger scale, taken on line III—III of Fig. 1;

Fig. 4 is a cross-sectional view, on a larger scale, taken on line IV—IV of Fig. 1;

Fig. 5 is a diagrammatic cross-sectional view illustrating the manner in which the various strips and webs are applied together when one method embodying the present invention is employed; and Fig. 6 is a view similar to Fig. 5, illustrating the arrangement of the strips and web members when another method embodying the present invention is employed.

Referring to Fig. 1, the apparatus illustrated therein comprises a calender 9 having two side frames 10 between which are carried and journaled a plurality of rolls 12, 13, 14 and 15. The rolls are driven by suitable gearing which is well known in the calender art, and which has not been illustrated. The rolls 12 and 13 have a rubber bank 18 placed in the bite thereof as illustrated and the rolls will form the rubber into a sheet 19 the thickness of which is controlled by the distance between the rolls. In a like manner the rolls 14 and 15 are provided with a rubber bank 20, which in turn forms a rubber sheet 21 of a thickness which is controlled by the distance between the rolls 14 and 15. A plurality of knives 23 and 24 are provided upon longitudinally extending rods 25 and 26 and serve to cut the rubber sheets 19 and 21 into strips 27 and 28 respectively of the desired width.

Conveyor tables 30 and 31 are provided on opposite sides of the calender 9 and serve to carry a web material 33, which is to be treated, to and from the calender. The conveyor tables 30 and 31 may include conveyor pulleys 35 and 36 which drive and support conveyor belts 37 and 38.

Superimposed above the calender 9 is another conveyor which comprises a belt 40 which is driven and supported by a plurality of rollers 41. Another conveyor comprising a belt 44 and rollers 45 is provided at the rear of the calender 9 so that the inner end thereof extends down near the opening between the rolls 13 and 14. A plurality of rollers 47 are provided, in the manner illustrated in Fig. 1, in order to support the material to be conveyed between the ends of the other conveyors.

Cooperating with one of the rollers 45 is a pressure roller 50 which may be provided in order to press the superimposed strips 27 and 28 and the web material 33 together in the desired manner.

The operation of the apparatus is as follows:

The web material 33, which may comprise a strip or a plurality of laterally spaced strips of rubberized breaker fabric for tires, is conveyed to the calender through the agency of the conveyor 37. The strip is thereafter fed over the top of the calender by the conveyor belt 40 and down between the pressure roller 50 and the roller 45, at which points the strips 27 and 28 formed on the calender are united against the web strip 33.

As stated above, the two upper rolls 14 and 15 form the strips 27 from the rubber bank 20. The knives 23 are positioned upon the transverse rod 25 so that the strips 27 are of the desired width and spacing. Of course the thickness of the strips 27 will be dependent upon the distance between the rolls 14 and 15, which can be varied in the usual manner by means not shown. The strips or strip 28 are formed by the rolls 12 and 13, together with the knives 24, in a manner similar to that by which the strips 27 are produced. The strips 27 and 28 pass between the rolls 13 and 14 which are spaced apart some distance to allow the passage of these strips without any pressing together of the strips. The strips which lie in superimposed relation are carried out upon the conveyor belt 44 and passed between the rollers 45 and 50, where the various strips and the web material are pressed together. The composite member thus produced, which is built up as shown in Fig. 5, is conveyed away from the calender upon the conveyor belt 38.

It will be evident that the thickness, the width, and the spacing of the strips 27, and 28 and that of the web 33, can be widely varied so that a composite body possessing the desired sizes and thicknesses can be produced.

The present invention is particularly adapted to apply a sheet of cushioning rubber against or to the side of a rubberized sheet of breaker fabric. Thus in the embodiment of the invention illustrated the web material 33 is a sheet or web of rubberized breaker fabric, while the sheet 28 is a strip of rubber cushioning stock which is adapted to cushion the tread of the tire upon the carcass. In conjunction with the breaker fabric the strips 27 are narrow strips of rubber gum which assist in securing the breaker and cushion together. When the present invention is employed, it is only necessary to pass the breaker fabric or web material through or by the calender once, so that the process and apparatus produces a substantial saving in time and labor and thus a material saving in cost over methods and apparatus formerly employed.

While the invention has been particularly illustrated and described as passing the web material or breaker fabric over the top of the calender, it is within the province of the invention to pass the web material to be coated or treated through the calender between the rolls 13 and 14 or even under the calender. In this connection, when it is desired to produce a composite body built up as shown in Fig. 6, the web material which is indicated at 33$^a$ will be passed through the calender in the manner indicated in dotted lines. It will thus be possible to simultaneously apply a coating of rubber, or the like, upon opposite sides of the web material. As indicated in Fig. 6, the upper sheet or coating 27$^a$ may be made of a greater width than that of the web material 33$^a$. The bottom sheet strip indicated at 28$^a$ may be of the same width as the upper sheet 27$^a$. By this process there is no necessity for spending time and labor in passing the web material through the calender more than once, and it is also possible to aline and position the web material and the strips so that a very excellent and uniform product is produced.

As illustrated in Fig. 2, it will be seen that the apparatus is adapted to operate simultaneously upon more than one strip of web material. In other words when relatively narrow strips are to be produced and superimposed, it is possible to simultaneously operate upon a plurality of strips which are placed in laterally spaced side by side relation upon the various conveyors and which pass through the calender in the same relation.

Although I have illustrated and described only the preferred form which the invention may assume, and have described that form in detail, it will be apparent to those skilled in the art that the invention is not so limited but that various modifications may be made therein without departing from the spirit of the invention or from the scope of the appended claim.

What I claim is:

Apparatus for treating web material which includes a four roll calender adapted to simultaneously produce two sheets of plastic material, adjustable knives contacting with said sheets and serving to cut the sheets into a plurality of strips, conveying means associated with said calender for carrying the strips from the calender, conveying means extending over the calender and carrying the web material and pressure rolls adapted to press the strips on the web material in superimposed relation.

WINFRED H. NIXON.